(12) United States Patent
Pearce

(10) Patent No.: US 7,377,114 B1
(45) Date of Patent: May 27, 2008

(54) TURBINE ENGINE PULSED FUEL INJECTION UTILIZING STAGGER INJECTOR OPERATION

(76) Inventor: Kevin P Pearce, 136 Shenkleview Dr., Johnstown, PA (US) 15905

( * ) Notice: Subject to any disclaimer, the term of this patent is extended or adjusted under 35 U.S.C. 154(b) by 0 days.

(21) Appl. No.: 10/709,877

(22) Filed: Jun. 2, 2004

(51) Int. Cl.
  F02C 7/22 (2006.01)
  F02C 7/26 (2006.01)
(52) U.S. Cl. .......................................... 60/776; 60/734
(58) Field of Classification Search ................. 60/726, 60/725, 773, 776, 39.21, 39.22, 39.24, 39.281, 60/804, 39.37, 734, 739, 740, 746, 747; 431/114
See application file for complete search history.

(56) References Cited

U.S. PATENT DOCUMENTS

| | | | |
|---|---|---|---|
| 3,688,495 A * | 9/1972 | Fehler et al. ............. 60/39.281 |
| 4,386,553 A * | 6/1983 | Thoman et al. ................ 91/361 |
| 4,464,895 A * | 8/1984 | Morrison et al. .............. 60/790 |
| 4,545,198 A * | 10/1985 | Yoshida ...................... 60/39.25 |
| 4,557,106 A * | 12/1985 | Williams et al. .......... 60/39.281 |
| 5,205,116 A * | 4/1993 | Ng ............................. 60/39.281 |
| 5,212,943 A * | 5/1993 | Harris ........................... 60/790 |
| 5,339,620 A * | 8/1994 | Ikeda et al. ..................... 60/773 |
| 5,339,635 A * | 8/1994 | Iwai et al. ...................... 60/733 |
| 5,349,811 A * | 9/1994 | Stickler et al. ................ 60/776 |
| 5,544,478 A * | 8/1996 | Shu et al. ....................... 60/773 |
| 5,884,483 A * | 3/1999 | Munro .......................... 60/739 |
| 6,145,297 A * | 11/2000 | Nagafuchi et al. ........ 60/39.281 |
| 6,742,340 B2 | 6/2004 | Nearhoof |
| 6,742,341 B2 * | 6/2004 | Ryan et al. .................... 60/773 |
| 6,761,032 B2 * | 7/2004 | Moser .......................... 60/773 |
| 6,786,049 B2 * | 9/2004 | Parsons et al. ................ 60/776 |
| 6,820,429 B2 * | 11/2004 | Meisner ........................ 60/773 |
| 6,857,272 B2 * | 2/2005 | Summerfield et al. ........ 60/739 |
| 6,877,307 B2 * | 4/2005 | Ryan et al. .............. 60/39.281 |
| 6,883,301 B2 * | 4/2005 | Woltmann ............... 60/39.281 |
| 6,920,761 B2 * | 7/2005 | Laper ........................... 60/772 |
| 6,945,030 B2 * | 9/2005 | Hirayama et al. .......... 60/39.27 |
| 2001/0027638 A1 * | 10/2001 | Paschereit et al. ......... 60/39.06 |
| 2002/0178730 A1 * | 12/2002 | Ganz et al. .................... 60/773 |
| 2002/0178733 A1 * | 12/2002 | Hellat et al. ................... 60/776 |
| 2002/0194851 A1 * | 12/2002 | Stalder et al. ................. 60/776 |
| 2003/0131605 A1 * | 7/2003 | Meisner ........................ 60/773 |
| 2005/0132694 A1 * | 6/2005 | Moser ...................... 60/39.281 |
| 2005/0198964 A1 * | 9/2005 | Myers et al. .................. 60/739 |
| 2005/0204745 A1 * | 9/2005 | Hirayama et al. ............ 60/773 |
| 2005/0247066 A1 * | 11/2005 | Myhre ........................... 60/803 |

\* cited by examiner

*Primary Examiner*—William H Rodriguez

(57) ABSTRACT

A method to control the output of a turbine engine pulses individual fuel injectors completely on and then completely off in selectable groups rather than in unison. The operation of the groups are staggered in time to minimize the periods of no fuel flow to the engine. Simplicity in the control of individual injectors is achieved by electrically controlling individual injectors rather than mechanically controlling the fuel supplied to all injectors, and, in addition, offers the advantage of minimizing the periods of no fuel flow to maintain combustion stability at low loads. Electrically controlling injectors positioned at the point of fuel usage improves upon fuel atomization and eliminates the problem of unequal distribution of fuel from multiple injection points connected to a common fuel metering system.

16 Claims, 9 Drawing Sheets

System Interconnection

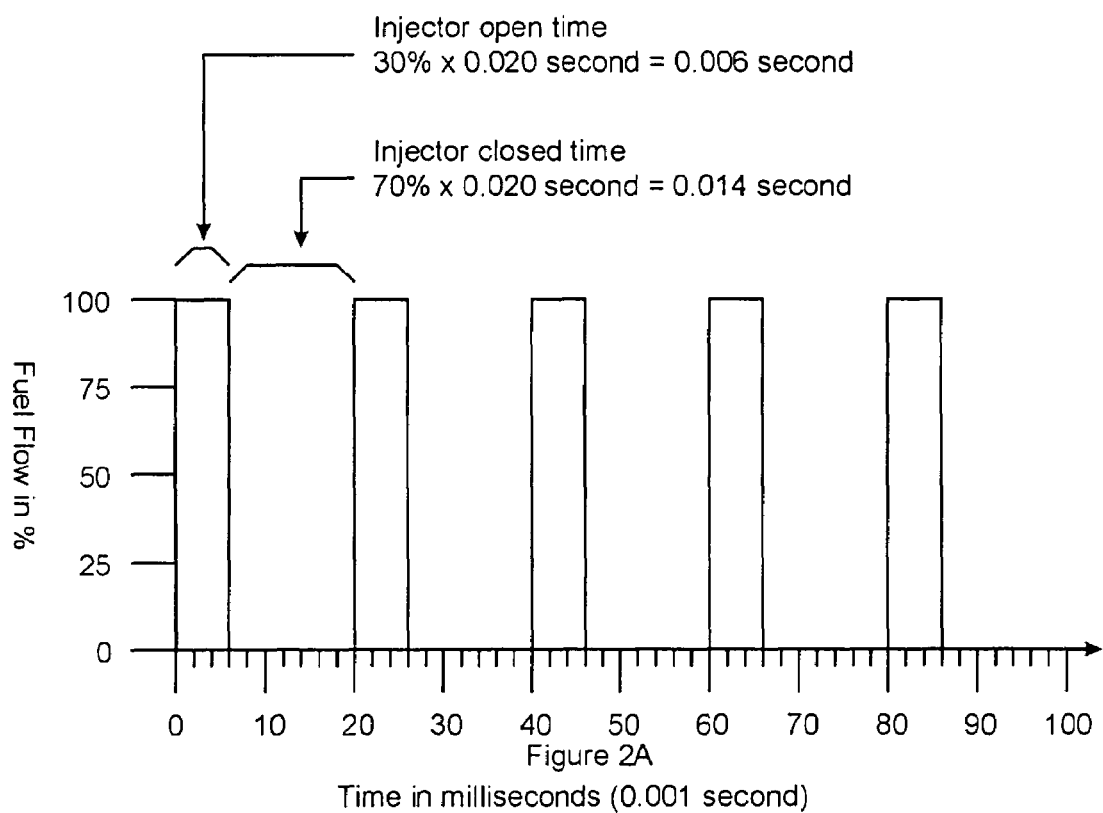

TURBINE ENGINE PULSED FUEL INJECTION UTILIZING STAGGER INJECTOR OPERATION

BACKGROUND OF INVENTION

Turbine engines currently utilize either a variable continuous stream or a pulsed stream to provide fuel to the engine. The primary objectives of both of these methods are to control the amount of fuel delivered to the engine and to attempt to deliver said fuel in the smallest droplet size, equally dispersed throughout the combustion area to promote rapid and complete combustion of the fuel. The continuous stream method relies upon control of the quantity of fuel delivered to the engine at some arbitrary point upstream of fuel utilization and by mechanical fractionation of the fuel stream while the pulsating injection method as taught by Nearhoof, et. al. in U.S. Pat. No. 6,742,430 ("Fuel Injection Control System for a Turbine Engine") rapidly turns the fuel on and off at the point of usage to achieve fractionation and control of the combustion process.

The continuous stream method suffers the problems of complexity of the metering equipment, limitations on the final fuel particle size due to utilizing mechanical breakup/dispersion techniques, and slow system response to changing loads due to the mechanical equipment comprising the fuel system. A further limitation of the continuous stream method is in the inherent weight and precision manufacturing tolerances of the necessary metering pump(s) and/or valve(s) to control fuel flow.

The pulsating injection method overcomes the limitations of the continuous stream method by eliminating the precision mechanical controls and the need for mechanical fractionation of the fuel stream but the engine is subject to loss of flame stability at low pulse on-times due to the proportionally long time when no fuel is being supplied during each pulse cycle.

This invention is designed to overcome these limitations by elimination of the mechanical metering equipment such as pumps and valves and by controlling groups of injectors independently rather than pulsing all injectors at the same time. Controlling groups of injectors overcomes the flame stability associated with pulsing all injectors at the same time along with maintaining the response and simplicity of the fuel delivery system lacking in the continuous stream method. The problem of flame stability has previously been overcome by introducing a small quantity of fuel through a continuously fed injector during periods when the main injectors are operating at a low duty cycle or by cycling the main injectors at a relatively high frequency to keep the off-time of each pulse short enough to maintain the combustion process over the more stable continuous stream delivery system. By sequentially operating groups of injectors, the time that the engine's fuel supply is shut off is reduced which allows the frequency of injector pulsing to be reduced to improve upon the overall life of the injectors and elimination of the supplemental continuous injector relied upon to maintain the combustion process.

SUMMARY OF INVENTION

This invention is an apparatus and method for controlling the injection of fuel in a turbine engine having a combustion chamber. The apparatus comprises at least four fuel injectors arranged and controlled in groups having means for delivering fuel in pulses to said groups of injectors within said combustion chamber of said turbine engine; at least one operating sensor, said sensor having means for receiving sensor signals from a selected operating function of said turbine engine; a programmable electronic control unit for receiving and comparing the value of said sensor signals from said turbine engine to the value of a desired signal, and for generating fuel injector control signals in response thereto; and a means for directing said fuel injector control signals to said fuel injector groups to modify the pulse duration and/or frequency of fuel injection in response to a deviation from a selected operating function, such as the desired engine speed, caused by variable operating loads encountered by the turbine engine. The method for controlling the injection of fuel in a turbine engine having a combustion chamber and having at least four fuel injectors arranged and controlled in groups and at least one sensor for sensing operating signals from said engine comprises the steps of delivering fuel in pulses to said combustion chamber using said injector groups; sensing at least one operating sensor signal from said programmable electronic control unit; at said programmable electronic control unit, comparing the value of said sensor signal to the value of a desired signal and generating fuel injector control signals to each group of said injectors in response to said sensor signal; and directing said fuel injector signals to said fuel injector groups to modify the pulse duration and/or frequency of fuel injection in response to a deviation from desired engine operation caused by variable operating loads encountered by the turbine engine.

BRIEF DESCRIPTION OF DRAWINGS

FIG. 2A is a representation of fuel delivery to a theoretical engine utilizing the pulsed method of fuel delivery to illustrate the period of lack of fuel at low pulse on-times.

DETAILED DESCRIPTION

Figure 1:
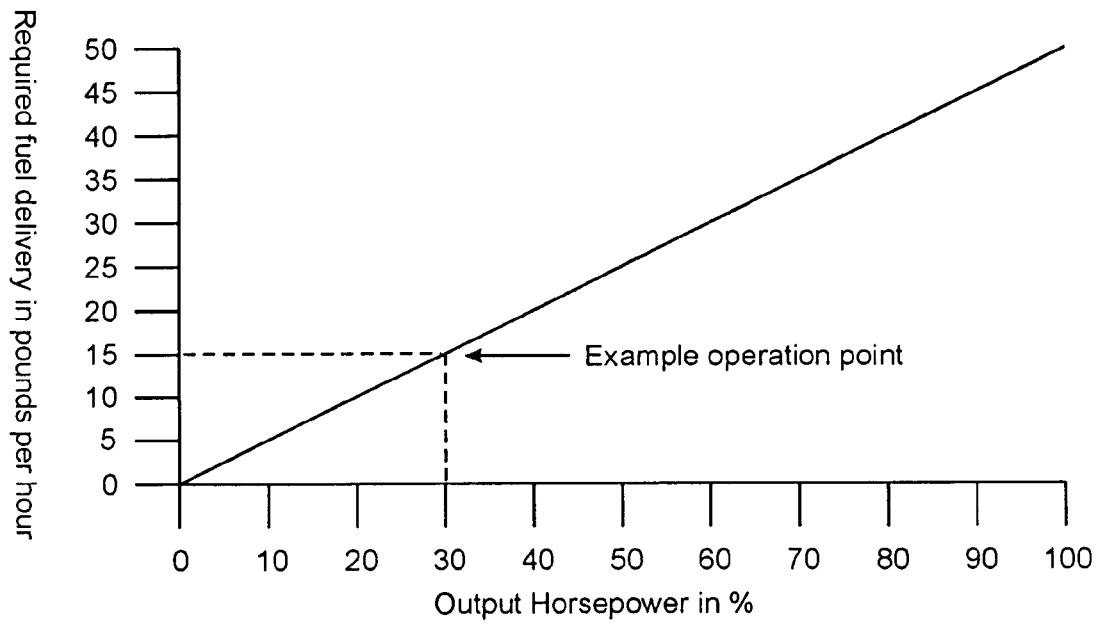
FIG. 1 is a plot of fuel flow versus load for a theoretical engine indicative of the fuel delivered to the engine by the continuous stream control systems. Indicated on FIG. 1 is an arbitrary operating point which is used in the following figures.

Referring now to FIG. 1 is a representation of fuel required by a typical turbine engine to achieve a given horsepower output. As can be seen from the plot, as greater horsepower output is required, more fuel must be made available to the engine for combustion. All fuel delivery systems exist for the purpose of regulating fuel to the engine in some manner to achieve the requirement of delivering greater amounts of fuel for greater amounts of power output. Prior art has utilized multiple fuel delivery nozzles or injection points spaced radially around the center of rotation of the turbine shaft. The quantity and sizing of the nozzles or injection points being in proportion to the maximum fuel delivery needs of the engine. Additionally, prior art has controlled all of the fuel delivery points in unison to maintain an equally balanced side thrust loading on the turbine wheel and shaft and to equalize thermal gradients throughout the combustion zone. Plotted on FIG. 1 is a selected operating point for the engine which will be used in the following Figures.

Figure 2B:
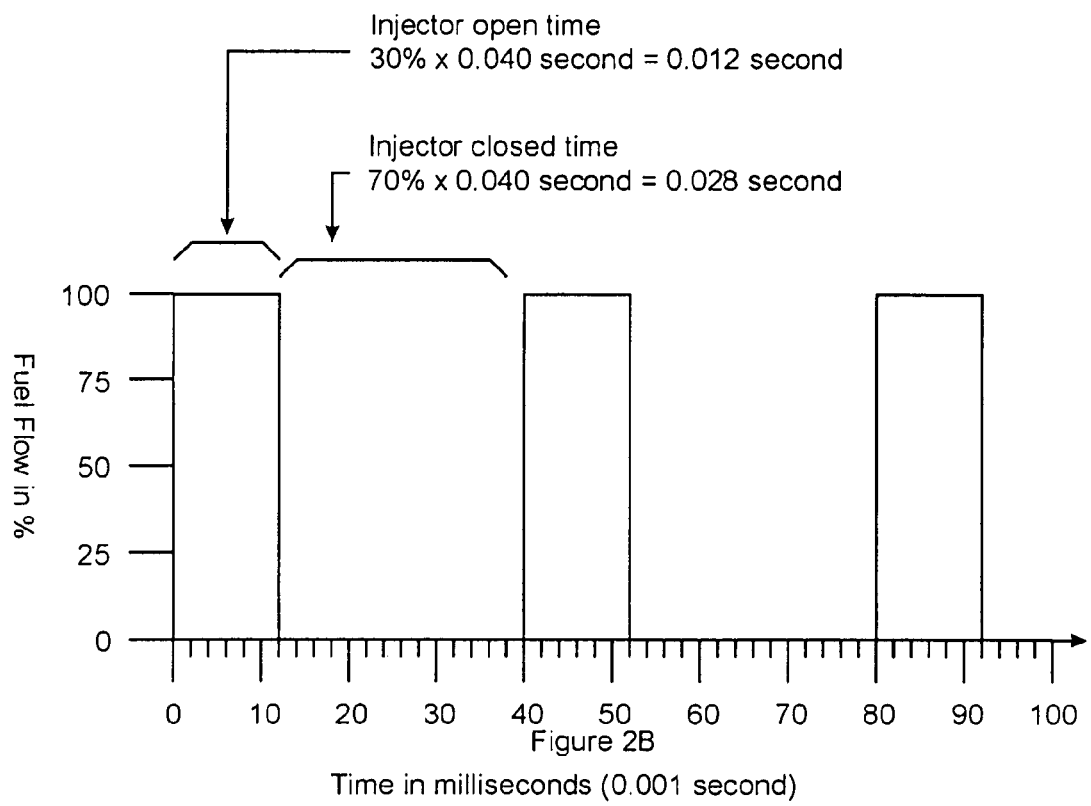
FIG. 2B is a representation of fuel delivery to the same theoretical engine of FIG. 1 utilizing the pulsed method of fuel delivery but at a lower pulsing frequency to demonstrate the effect of pulse frequency on the period of no fuel flow.

Referring now to FIG. 2A and FIG. 2B is a representation of how fuel is delivered to a typical turbine engine at the selected operating point called out in FIG. 1 by achieving control of the quantity by pulsing the injectors in unison. Prior art as described by Nearhoof et. al. improves upon the continuous stream delivery method by turning the fuel flow on and off at the point of discharge into the turbine combustion area thus eliminating the metering pumps and/or control valving along with the conduits between the point of control of the fuel and the point of fuel delivery into the combustion zone. All metering is controlled at the point of utilization by rapidly turning each injector on and off in unison. The longer during a cycle that the injectors are turned on, the more fuel that is delivered. As demonstrated in FIG. 1, if a theoretical point on the curve is selected of desiring an output of 30 percent of full horsepower it is necessary to provide the engine with 15 pounds per hour of fuel. Utilizing the pulsed method of injection and using a nominal 50 pulses per second FIG. 2A demonstrates 15 pounds per hour of fuel requires the injectors to be open 30 percent of the time and closed 70 percent of the time. At 50 pulses per second this becomes open for 30 percent of 0.020 seconds or 0.006 seconds and closed for 70 percent of 0.020 seconds or 0.014 seconds after which time the cycle is repeated. FIG. 2B demonstrates the same method of control as in FIG. 2A but at a lower pulse rate of 25 pulses per second as an example. The same ratio holds true but now the open time is 0.012 seconds and the closed time is 0.028 seconds. An inherent problem with starting and stopping all fuel flow to the engine is that, during periods of low fuel demand a means must be provided to maintain the flame in the combustion zone. This has been accomplished by several means with the two most common being a very rapid frequency of pulsation or with the introduction of a small quantity of fuel through a continuously fed injector during low on-time operation to maintain ignition of the flame during the off-time portion of the pulsating fuel supply provided the main injectors.

Figure 3:
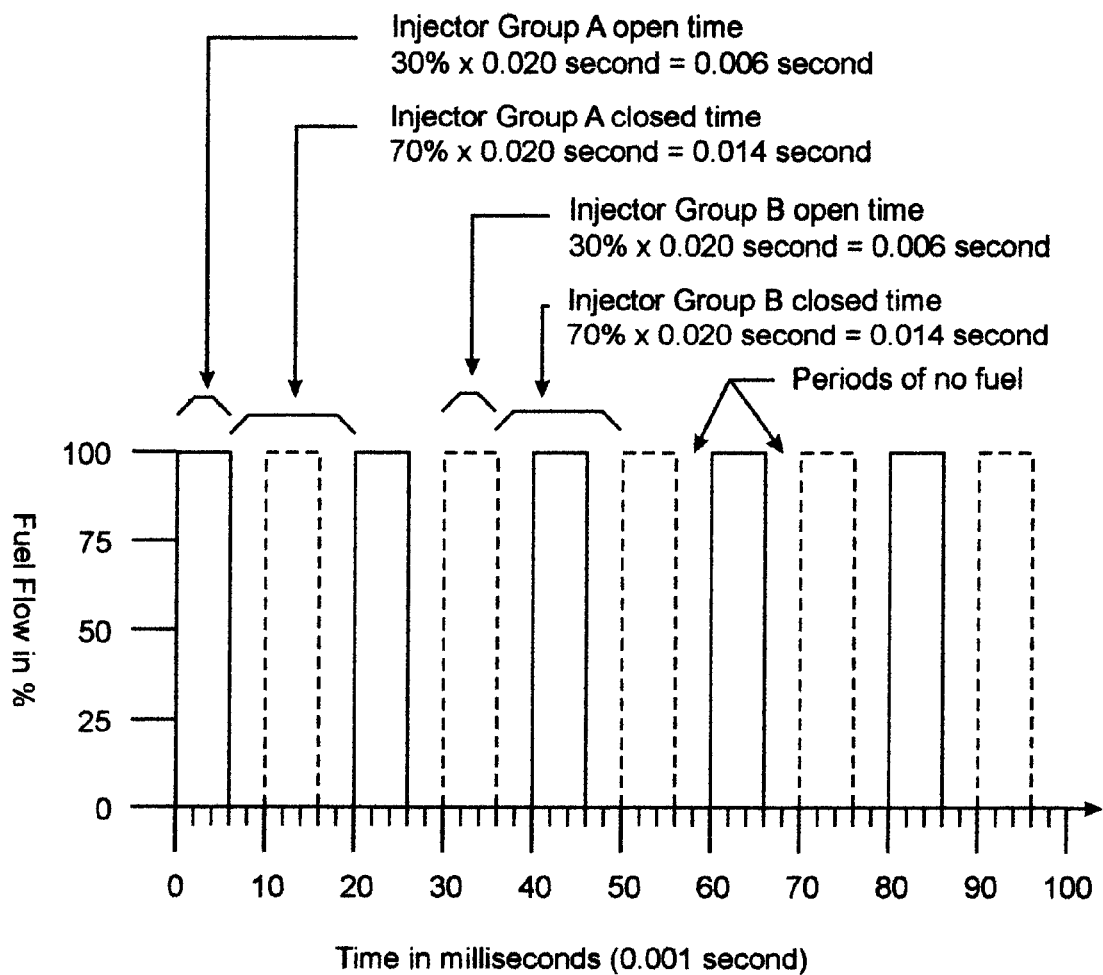
FIG. 3 is a representation of fuel delivery to the same theoretical engine of FIG. 1 utilizing the grouped method of pulsed fuel delivery at the same frequency as in FIG. 2A to demonstrate the greatly improved period of no fuel flow.

Referring now to FIG. 3 is a representation of the same fuel delivered to a typical turbine engine as in FIG. 1 and FIG. 2A but by controlling the injectors in groups. As previously demonstrated in FIG. 1 if a point for operation of the same theoretical engine is selected on the curve of desiring an output of 30 percent of full horsepower it is still necessary to provide the engine with 15 pounds per hour of fuel. Once again utilizing the pulsed method of injection and using a nominal 50 pulses per second FIG. 3 demonstrates 15 pounds per hour of fuel requires the injectors to be open 30 percent of the time and closed 70 percent of the time. Since in this example only half of the injectors are open at a given time, the amount of fuel being delivered is only half of the total with the result that an open time of 0.006 seconds and a closed time of 0.014 seconds is still required for each of the two groups. The objective of this invention is to stagger to opening times of the groups. Consequently, the sequence of operation is now Group A opens for 30 percent of its cycle of 0.006 seconds then closes. Group B is delayed by one half of a cycle of 0.020 seconds and begins its cycle 0.010 seconds later and is then activated for its open time of 0.006 seconds. Now Group A is activated and the cycle begins to repeat. The net result of the staggered operation is that the engine is in a no-fuel condition only during the period between the closing of one group and the opening of the other group. In the case in point the period of no fuel supply is reduced to 0.004 seconds. In both cases, the total fuel delivered to the engine over time is the same but with the period of no fuel being supplied being drastically reduced.

Figure 4:
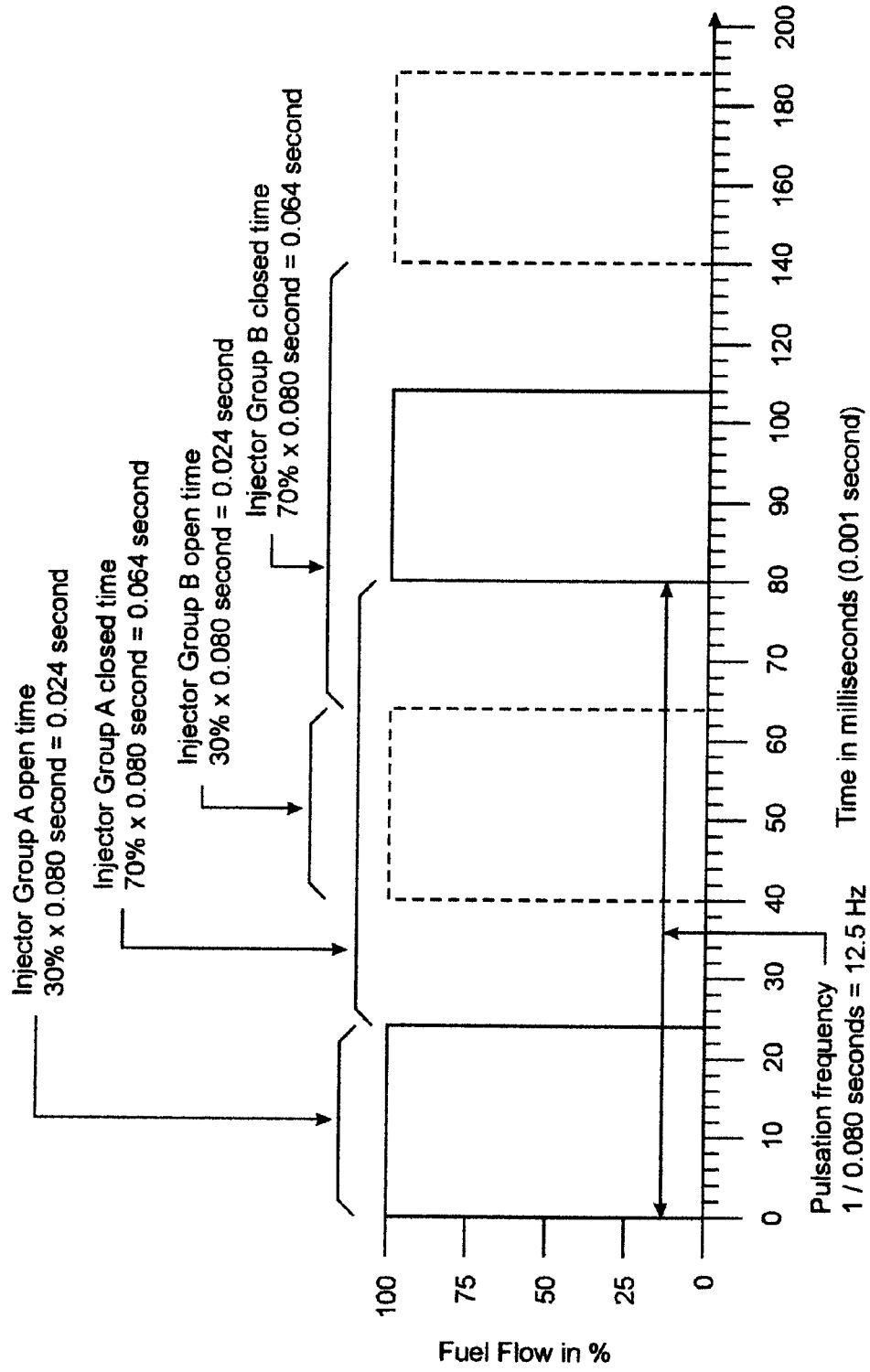
FIG. 4 is a representation of fuel delivery to the same theoretical engine of FIG. 1 utilizing the grouped method of pulsed fuel delivery to illustrate the reduction in pulsation frequency possible by utilizing the grouped method while maintaining the same off time as in FIG. 2A.

Referring now to FIG. 4 is a representation of the same fuel delivered to a typical turbine engine as in FIG. 1 and FIG. 2A but showing the possible reduction in frequency of pulsation to not only achieve the same quantity of fuel being supplied over time but additionally maintaining the same period of no fuel flow as in FIG. 2A. If it is assumed that the engine operation is stable with a time period of 0.014 seconds of no fuel flow as is being achieved by operating all injectors in unison at 50 cycles per second at a 30 percent on time to provide 15 pounds per hour to the engine FIG. 4 now demonstrates that if the injectors are pulsed in two staggered groups as in FIG. 3 it is possible to reduce the operating frequency to 12.5 cycles per second. As the objective of this invention is to reduce the period of no fuel flow, the optimum operating frequency would likely be at some value between original 50 cycles per second and the possible 12.5 cycles per second to gain both the benefits of a shorter period of no fuel flow and improved injector life from operation at a lower frequency.

Figure 5A:
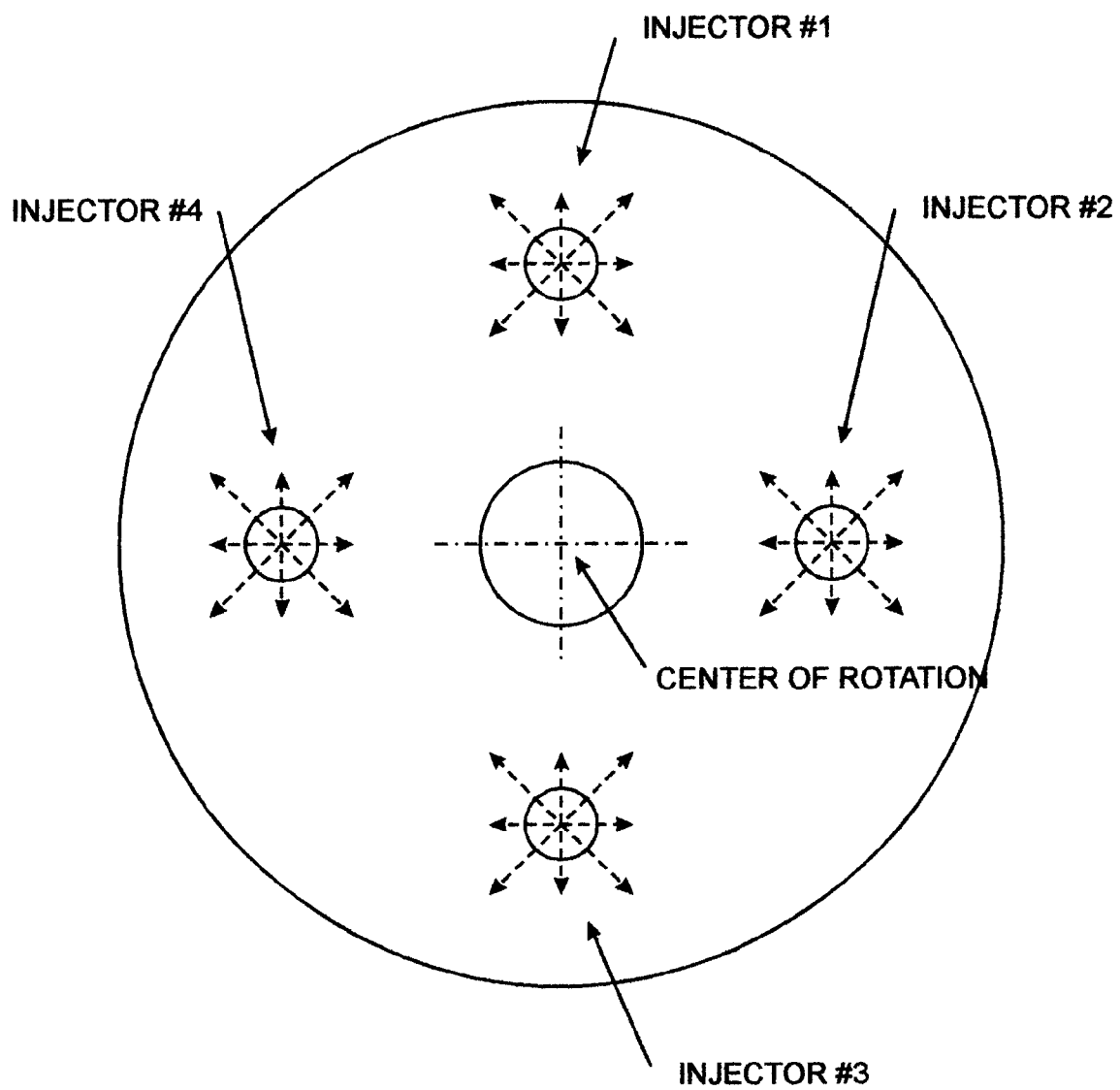
FIG. 5A is an internal view of a group of four (4) injectors as typically spaced around the combustion chamber oriented parallel to the axis of the turbine shaft.

Referring now to FIG. 5A which shows an internal view of the injectors entering the combustion housing of the engine. For clarity, the injectors are shown as penetrating the combustion zone parallel to the axis of the turbine shaft. The objectives of this invention will also apply to injectors arranged to penetrate the combustion zone oriented at some angle to the axis of the turbine shaft. FIG. 5A would be a typical layout in an engine utilizing the minimum number of injectors possible. In prior art, all four injectors would be operated in unison for each cycle. In the grouped method of operation, the injectors would be operated with injector #1 and injector #3 being a group and operating at the same time while injector #2 and injector #4 would comprise the other group and be operated together. As such, there is always an equally balanced side thrust and thermal gradient on the internal engine components.

Figure 5B:
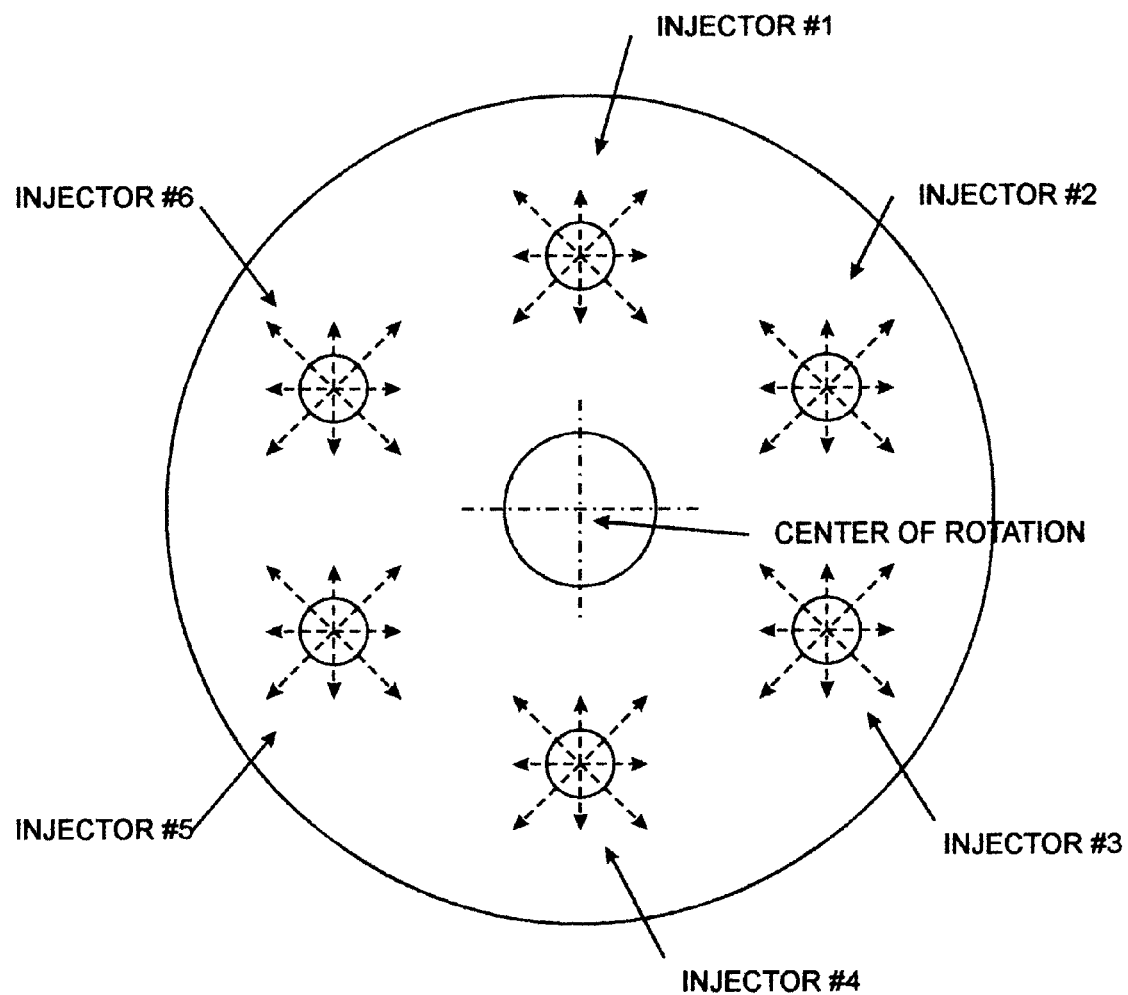
FIG. 5B is an internal view of a group of six (6) injectors as typically spaced around the combustion chamber oriented parallel to the axis of the turbine shaft.
Figure 6A:
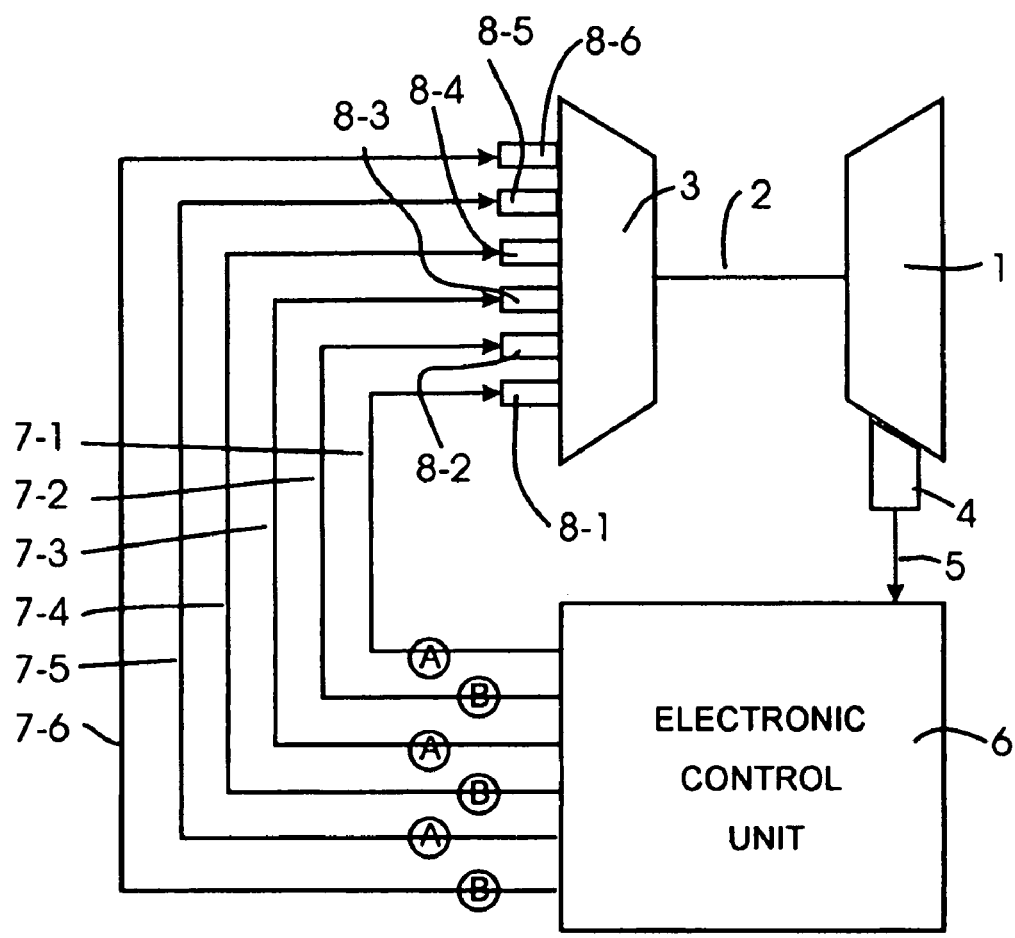
FIGS. 6A and 6B are schematic representations of the components and their arrangement in the invention: compressor 1, shaft 2, combustion section 3, rotational sensor 4, signal connection means 5, electronic control unit 6, output signal means 7-1, 7-2, 7-3, 7-4, 7-5, and 7-6, and injectors 8-1, 8-2, 8-3, 8-4, 8-5, and 8-6. Output signal means identically labeled with letters indicate members of a group determined by the electronic control unit.
Figure 6B:
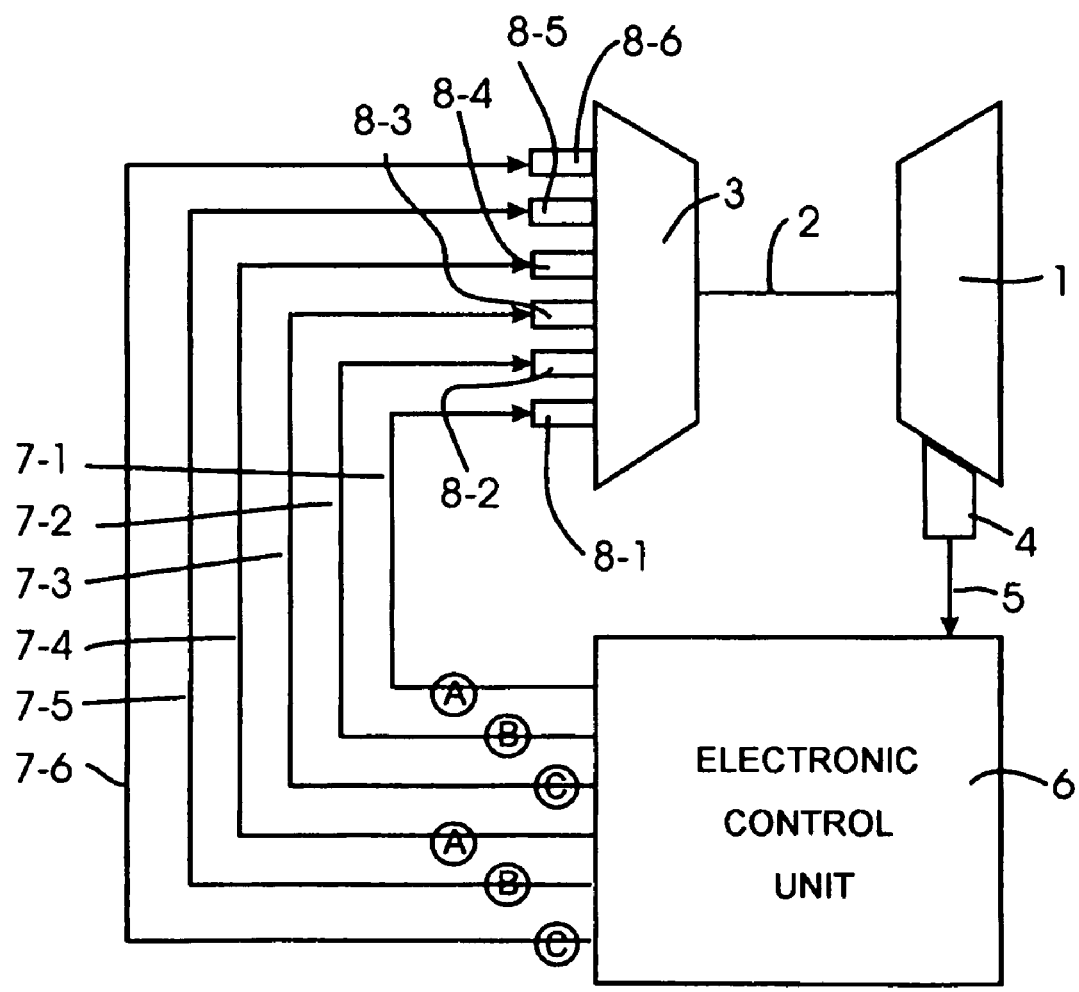

Referring now to FIG. 5B which also shows an internal view of the injectors entering the combustion housing of the engine. FIG. 5B would be a typical layout for a larger engine requiring more fuel than could be readily or uniformly supplied by the minimum required quantity of four injectors. For clarity, the injectors are shown as penetrating the combustion zone parallel to the axis of the turbine shaft. The objectives of this invention will also apply to injectors arranged to penetrate the combustion zone oriented at some angle to the axis of the turbine shaft. Once again, prior art would operate all six injectors in unison for each cycle. Utilizing the grouped method of operation, two operating patterns are now possible. If desired, injector #1, injector #3, and injector #5 would be a group while injector #2, injector #4, and injector #6 would be the other group. Operation would alternate between the two groups, side thrust and thermal gradients on the internal engine components would be balanced as in FIG. 5A. It is also the intent of this invention to provide for more than two groups. In this case, injector #1 and injector #4 would be the first group, injector #2 and injector #5 would be the second group, and injector #3 and injector #6 would be the third group. Operation in this embodiment would be group 1, group 2, group 3 for a complete cycle after which the process would repeat. This embodiment would maintain the balanced loading upon the engine internal components. In an even larger engine, the same types of grouping would be utilized but with more available patterns. As an example, if the engine would require 12 injectors to provide sufficient fuel the system could be designed to operate with two injectors per group controlled as six groups, three injectors per group controlled as four groups, four injectors per group controlled as three groups, or six injectors per group controlled as two groups. In all cases, the objective of balanced loading and thermal gradients of internal engine components would be maintained.

The invention claimed is:

1. An apparatus for controlling the injection of fuel in a turbine engine having a engine shaft and a combustion chamber, said apparatus comprising:
    a) at least four fuel injectors selectably arranged in independent groups for delivering fuel in pulses to said combustion chamber of said turbine engine;
    b) at least one operating sensor, said sensor having means for receiving sensor signals from a selected operating function of said turbine engine;
    c) a programmable electronic control unit for receiving and comparing the value of said sensor signals from said turbine engine to the value of a desired signal, and for generating fuel injector control signals to said selectable groups of injectors, independently from each other and staggered in time, in response thereto; and
    d) a means for directing said fuel injector control signals to said selected fuel injector groups to modify the pulse duration and/or frequency of said fuel injector groups in response to a deviation from desired engine speeds caused by variable operating loads encountered by said turbine engine.

2. The apparatus of claim 1 wherein said selected fuel injector groups each atomizes the fuel supplied to individual injectors within said group and delivers said fuel in pulses from each injector within said group as a fine mist directly into said combustion chamber at the point of utilization.

3. The apparatus of claim 1 wherein the fuel injectors are selectively divided into groups by the programmable electronic control unit with an equal number of fuel injectors in each group.

4. The apparatus of claim 1 wherein at least one said operating sensor receiving input from a selected operating function of said turbine engine is utilized to control the pulse width and/or frequency of said selected groups of fuel injectors.

5. The apparatus of claim 1 in which the programmable electronic control unit consists of a group comprising a microprocessor and a microcomputer to control said selected injector groups.

6. The apparatus of claim 1 in which the orientation of said selected injectors penetrating said combustion chamber of said turbine is parallel to the axis of said turbine engine's shaft or displaced at some angle from the axis of said turbine shaft.

7. A method for controlling the injection of fuel in pulses by selectable groups of injectors in a turbine engine having a engine shaft and a combustion chamber and having at least four fuel injectors arranged in groups and at least one sensor for sensing operating signals from said engine, said method comprising the steps of:
    a) sensing at least one operating sensor signal from said turbine engine using said sensor;
    b) receiving and comparing with a programmable electronic control unit the value for said sensor signals from said turbine engine to the value of a desired signal and generating with said electronic control unit fuel injector control signals to said selected groups of injectors in response thereto;
    c) directing said fuel injector signals to said selected groups of fuel injectors to modify the pulse duration and/or frequency of fuel injection of said groups independently from each other in response to a deviation from desired engine operating parameters caused by variable operating loads encountered by said turbine engine; and
    c) delivering fuel in pulses to said combustion chamber using said selected groups of fuel injectors.

8. The method of claim 7 wherein said operating sensor signal is generated from a selected parameter of said turbine engine.

9. The method of claim 7 wherein said step of generating control signals to selected groups of injectors by said programmable electronic control unit is accomplished using a pulse width modulation system comprising at least one of a microprocessor and a microcomputer.

10. The method of claim 7 wherein said turbine engine comprises at least two selected groups of fuel injectors utilizing at least two injectors in each group.

11. The method of claim 7 wherein the injectors in each selected group are equally distributed radially around the combustion chamber.

12. The method of claim 7 wherein said selected injectors are arranged to penetrate the combustion chamber of said turbine engine either parallel to the axis of the shaft of said turbine engine or displaced at some angle from the axis of said turbine shaft.

13. The method of claim 7 in which the fuel injector signals to each group are staggered in time.

14. The apparatus of claim 1 in which the injectors in each selected group are equally distributed radially around the combustion chamber.

15. The method of claim 7 in which two groups of fuel injectors are used, when the load is less than 50%, the fuel injectors deliver no fuel to the combustion chamber for short intervals of time.

16. The method of claim 7 in which no fuel is delivered to the combustion chamber for short intervals of time when the load is less than 100%/N where N is the number of injector groups being used.

* * * * *